United States Patent
Cabuz et al.

(10) Patent No.: US 6,184,608 B1
(45) Date of Patent: Feb. 6, 2001

(54) POLYMER MICROACTUATOR ARRAY WITH MACROSCOPIC FORCE AND DISPLACEMENT

(75) Inventors: Cleopatra Cabuz, Edina; Robert D. Horning, Savage; William R. Herb, Minneapolis, all of MN (US)

(73) Assignee: Honeywell International Inc., Morristown, NJ (US)

( * ) Notice: Under 35 U.S.C. 154(b), the term of this patent shall be extended for 0 days.

(21) Appl. No.: 09/223,368

(22) Filed: Dec. 29, 1998

(51) Int. Cl.$^7$ ........................................... H02N 1/00
(52) U.S. Cl. .............................................. 310/309
(58) Field of Search ..................... 310/309; 251/30.05, 251/30.02, 34, 39, 41, 45, 46

(56) References Cited

U.S. PATENT DOCUMENTS

| | | | |
|---|---|---|---|
| 2,975,307 | 3/1961 | Schroeder | 310/309 |
| 3,070,775 | 12/1962 | Andrews | 310/357 |
| 4,654,546 | 3/1987 | Kirjavainen | 307/400 |
| 5,206,557 | 4/1993 | Bobbio | 310/309 |
| 5,434,464 | 7/1995 | Bobbio et al. | 310/309 |
| 5,563,466 | 10/1996 | Rennex et al. | 310/309 |
| 5,682,075 | 10/1997 | Bolleman et al. | 310/309 |

FOREIGN PATENT DOCUMENTS

| | | | |
|---|---|---|---|
| 40-5252760 | 9/1993 | (JP) | 310/309 |
| 744877 | 1/1978 | (SU) | 310/309 |
| 9634701A | 11/1996 | (WO) . | |

OTHER PUBLICATIONS

Motoharu Yamaguchi et al: "Distributed Electrostatic Micro Actuator" Proceedings of the Workshop on Micro Electro Mechanical Systems (MEMS), US, New York, IEEE, vol. Workshop 6, 1993, pp. 18–23, XP000366849 ISBN: 0–7803–0957–X The Whole Document.

Minami et al.: "Fabrication of Distributed ELectrostatic Micro Actuator (DEMA)", Journal of MIcroelectromechanical Systems, US, IEEE, Inc. New York., vol. 2, No. 3 1 Sep. 1993 (Sep. 2, 1993) pp. 121–127, XP000426532, ISSN: 1057–7157, The Whole Document.

*Primary Examiner*—Mark Budd
(74) *Attorney, Agent, or Firm*—John G. Shudy, Jr.

(57) ABSTRACT

A microactuator array device, which includes a plurality of generally parallel thin flexible polymer sheets bonded together in a predetermined pattern to form an array of unit cells on at least one layer. Thin conductive and dielectric films are deposited on the sheets to form a plurality of electrodes associated with the array of unit cells. A source of electric potential operably connects the electrodes, whereby electrostatic forces are generated most intensely proximate the point where the gap between the sheets is smallest. Inlets and outlets for each cell permit displacement of fluid during generation of the electrostatic forces. In a preferred embodiment, the plurality of sheets forms a stack of layers of arrays of unit cells. The layers are configured such that bi-directional activation is caused by pairs of actuators working opposite each other. At least one of every pair of the sheets may be preformed into corrugations or into flaps to provide a predetermined mechanical bias between the pairs, or the sheets may form curved portions by an applied load to provide a displacement between the pairs. The sheets are preferably from about 1 μm to about 100 μm thick and the cells preferably have an individual displacement of from about 5 μm to about 200 μm.

13 Claims, 2 Drawing Sheets

US 6,184,608 B1

POLYMER MICROACTUATOR ARRAY WITH MACROSCOPIC FORCE AND DISPLACEMENT

The Government may have rights in this invention pursuant to Contract No. F30602-98-C-0217, awarded by the Department of the Air Force.

FIELD OF THE INVENTION

The present invention relates to microactuators having macroscopic force and displacement. More particularly the invention relates to microactuators comprising a 3-D array of small actuator cells which are formed from plastic sheets provided with electrodes and stacked.

BACKGROUND OF THE INVENTION

Most microactuator arrays, used as MEMS devices, are fabricated in silicon. Despite the many favorable attributes of silicon, however, it is not always a suitable or ideal material for every application of MEMS. Silicon is brittle and subject to breaking, particularly as the total device size increases. This brittleness limits devices, especially actuators, to relatively small sizes capable of only small displacements and forces. The shapes that can be realized in silicon are typically restricted by crystalline planes or 2-D fabrication processes, and more complicated structures often result in prohibitively high cost and low yield.

It would be of great advantage to the art if another material, other than silicon, could be used for MEMS and actuators.

It would be another great advance in the art if the material would not be brittle and subject to breaking, thus not limiting the size and therefore the displacement and force of the final device. Other advantages will appear hereinafter.

SUMMARY OF THE INVENTION

It has now been discovered that the above and other advantages of the present invention may be realized in the following manner. Specifically, the present invention comprises a microactuator capable of macroscopic forces and displacements suitable for many "real world" applications.

The invention contemplates the formation of a 3-D array of small actuator cells, each of which is capable of a small force and small displacement. When coupled or ganged together, either in parallel, in series, or both, the resultant array is capable of generating macroscopic forces and displacements simultaneously.

In the present invention, position resolution is as small as the displacement of the smallest unit cell or cells in the array. Actuation is accomplished electrostatically, using the attraction at the smallest gap between electrodes to produce a "rolling" motion in the cells. The invention may be operated.

Key to the invention is the use of polymer materials rather than silicon, as silicon is not capable of being formed into the present device. A resulting lightweight, easily fabricated, low cost device is the result of the present invention.

The microactuator array device of this invention is formed from a plurality of generally parallel thin flexible polymer sheets bonded together in a predetermined pattern to form an array of unit cells on the various layers. Thin layers of conductive films and dielectric materials are deposited on the sheets to form a plurality of electrodes associated with the array of unit cells in a conventional manner.

Inlets and outlets are used during generation of electrostatic forces.

A source of electric potential operably connects the electrodes whereby adjacent layers of electrodes are biased with respect to each other to generate electrostatic action. Electrostatic actuation is a pull type action, so pairs of actuators work with each other to accomplish bi-directional activation.

BRIEF DESCRIPTION OF THE DRAWINGS

For a more complete understanding of the invention, reference is hereby made to the drawings, in which.

DETAILED DESCRIPTION OF THE PREFERRED EMBODIMENT

The present invention provides an improved, low power microactuator array having significantly greater macroscopic force and displacement than heretofore possible in silicon based MEMS devices. This is accomplished by the use of polymers as a class of materials for forming actuators of the type described herein. Polymers possess a wide range of properties, most of them being complimentary to silicon. In the present invention environment, polymers are not brittle and do not break under the forces generated by the devices of this invention. For this reason, actuators are not limited to small sizes with small displacement and force.

The resulting arrays are fully 3-D in realization, due to the many fabrication techniques available now in polymer technology. Since polymers are lightweight, having a typical density in the range of 1 g/cm$^3$, essentially the same as water, they are considerably lighter than typical inorganic materials such as silicon. This gives the present invention a power to mass ration which compares favorably with other systems, such as, for example, biological systems.

The key features of the present invention and the application of polymer technology to fabrication of a family of MEMS actuators not possible heretofore with traditional silicon micromachining is the generation of large forces and displacements with actuation from low power electrostatic arrays that spatially separate the high force and high deflection regions. Force and displacement are multiplied by the use of a 3-D array of unit cells. Additionally, the uniformity and simplicity of the individual parts translates into a cost effective fabrication process, using many standard polymer processing techniques. These techniques may have to be refined to meet more demanding requirements of the present technology.

Figure 1:
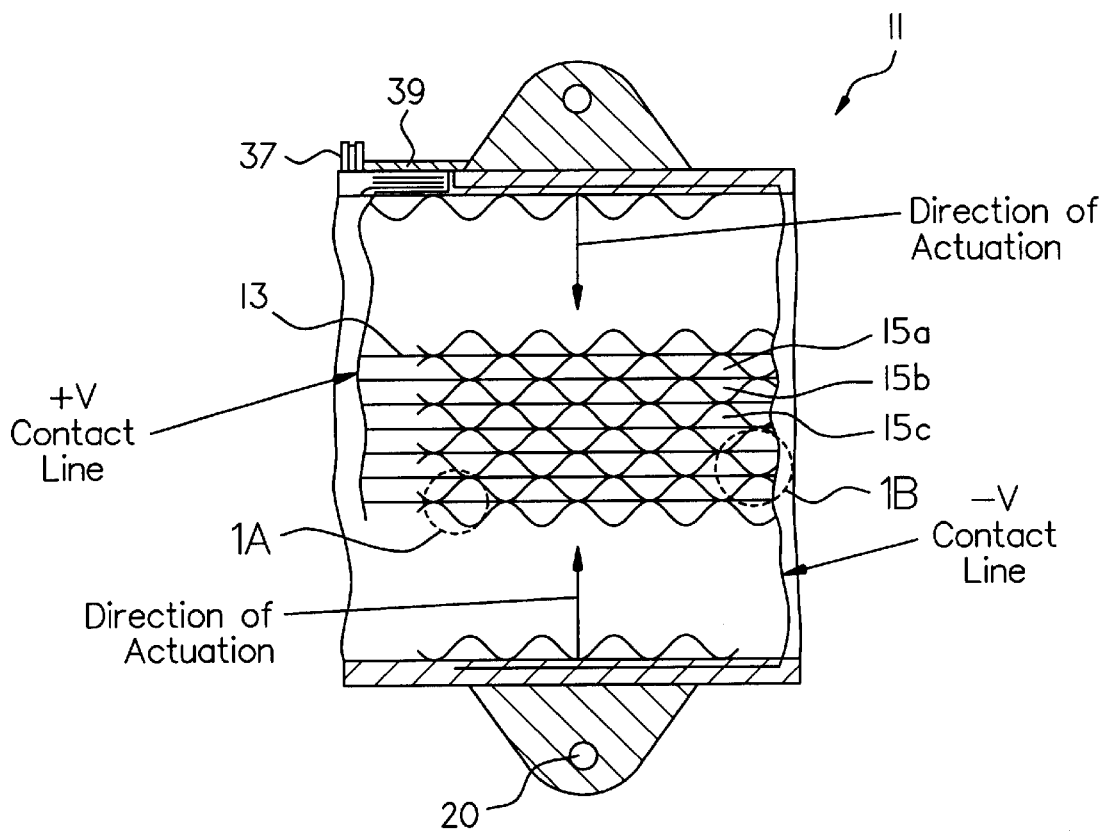
FIGS. 1, 1a and 1b are schematic views, partially cut away and in section, showing a first embodiment of the present invention.
Figures 1A, 1B:
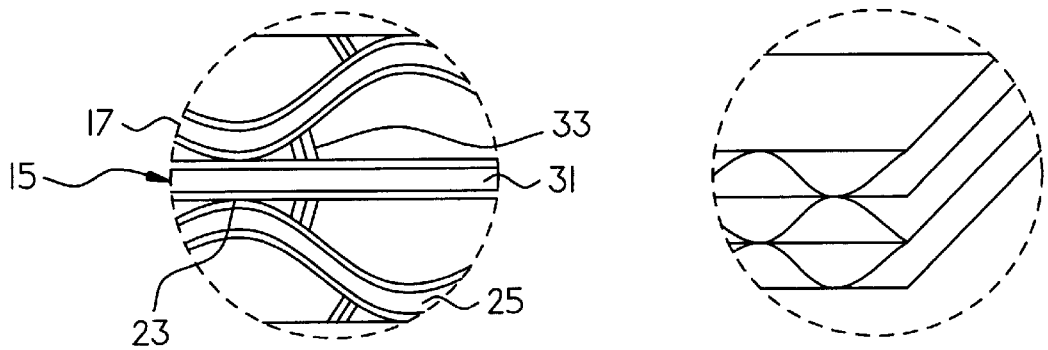
Figure 2:
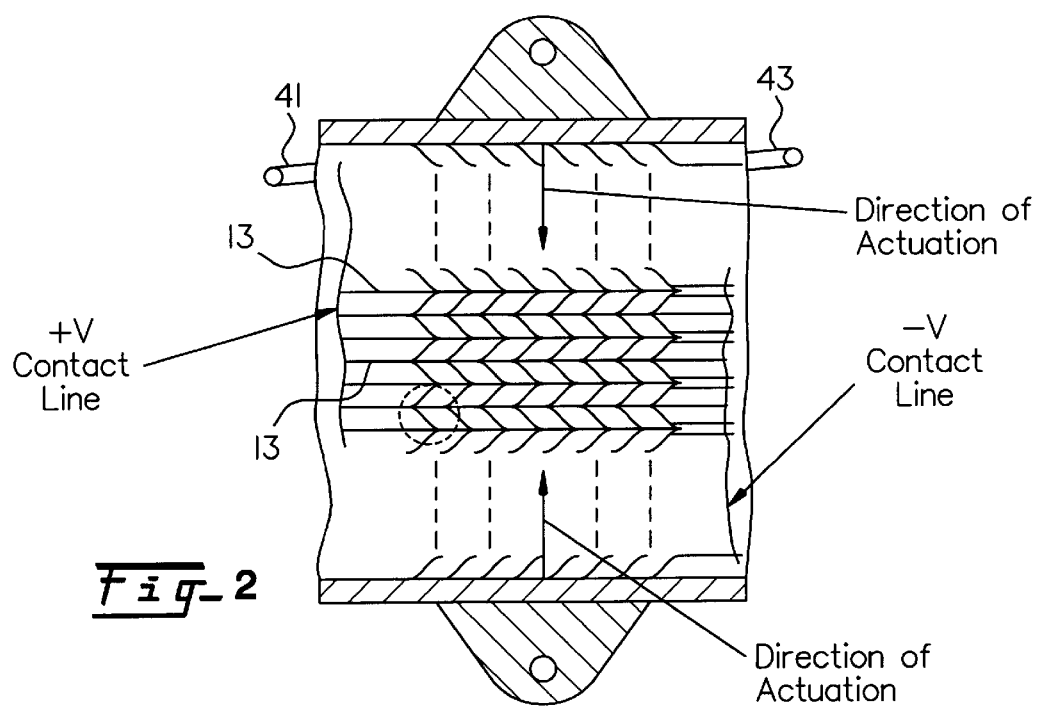
FIGS. 2 and 2a are schematic views, partially cut away and in section, showing a second, related embodiment of the present invention.
Figure 2A:
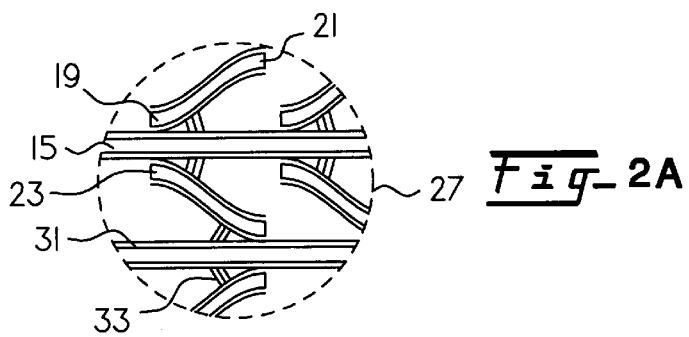

One embodiment of the present design is shown in FIGS. 1, 1a and 1b while a similar embodiment is illustrated in FIGS. 2, and 2b. Construction of both embodiments, as well as other forms of the present invention, begins with polymers formed into thin sheets. The sheets are preferably from about 1 μm to about 100 μm thick, and the cells preferably have an individual displacement of from about 5 μm to about 200 μm.

It is only required that the sheets be flexible and not brittle, properties found in many polymers. One particularly useful polymer is the polyimide sold as KAPTON®, (registered trademark of E. I. du Pont de Nemours & Co., Wilmington, Del.). Others include KALADEX® (registered trademark of ICI Films, Wilmington, Del.) and MYLAR® (registered trademark of E. I. du Pont de Nemours & Co., Wilmington, Del.), or any flexibly elastic polymer that permits it to deform as described herein. Fabrication of the sheets may be based, in part, upon technology developed for keyboard and flexible circuits that are produced in huge quantities, making the process well optimized. Preferred sheets are made from polymer films such as KAPTON® or MYLAR® (registered trademark of E. I. du Pont de Nemours & Co., Wilmington, Del.), or different polymers that are or become commercially available. The invention also contemplates the use of conductive polymers with a dielectric, thus eliminating the need for separate electrodes in this embodiment.

As seen in FIGS. 1, 1a and 1b and FIGS. 2, and 2b, a polymer-based microactuator array 11, generally, comprises a plurality of polymeric sheets 13. In FIGS. 1, 1a and 1b, alternating sheets 15 are flat, although this is not necessary for the purposes of this invention, and alternating sheets 17 are corrugated. Having one flat sheet 15 results in larger forces, while corrugated sheets 17 are more flexible. In FIGS. 2, and 2b, alternating with flat sheets 15 are sheets 19 formed in parallel rows of flaps 21. In any form of the present invention, the sheets 13 may be preformed with a specific curvature, such as corrugations 17 or flaps 21, or left flat to be curved by the applied load during use, depending upon design considerations and the final use of the microactuator array being contemplated.

In all applications, the sheets 13 are bonded together at specific points 23, forming an array of unit cells 25 in FIGS. 1, 1a and 1b or cells 27 in FIGS. 2, and 2b. Each cell 25, or 27 or those formed by or under an applied load during use, produces a small force and small displacement. The total force is the sum of the forces from all unit cells on the sheet. Sheets of unit cells are then stacked, such as 15a, 15b, etc. in FIG. 1. The total displacement is the sum of the displacements of each layer in the stack.

Layers in the stack may be actuated independently, resulting in positioning anywhere from zero to the maximum displacement, with resolution equal to the displacement of the smallest layer in the stack. The stack may be actuated individually, or in combinations of layers.

It is possible to construct a wide variety of arrays under the concepts of the present invention. For example, the cells shown in FIG. 1 are parallel rows of corrugations, whereas FIG. 2 illustrates parallel rows of flaps. A 2-D arrangement of corrugations, flaps and/or membranes is another example of the orientation of the polymeric sheets. Also, each cell in a given layer need not be the same dimension as the others. It is contemplated to make some corrugations, membranes or flaps smaller or differently shaped than others, to limit the total displacement from that layer. Alternatively, cell dimensions may be varied within one layer so as to have the total displacement different on different parts of that layer. During operation of this embodiment, the curvature of the sheet would vary, resulting in an orientation change of the actuated load or the application of a bending moment to the load. For example, flat sheets are employed in a design similar to FIG. 1, the load would be applied on the hook 20 at the bottom of the device.

Of course, the displacement of each layer need not be the same as that of other layers. For example, a stack may be constructed from individual layers designed for displacements ranging from less than 5 $\mu$m to more than 200 $\mu$m. Total displacements, which are the sum of the individual layers, can easily exceed 1 mm using a modest number of layers, with position accuracy of, say, 5 $\mu$m or the smallest layer used.

The polymeric layers 13 also include thin metal films 31 on the front and back surfaces of each sheet, to function as electrodes. Adjacent layers are biased with respect to each other, generating large electrostatic forces at the points where the gap 33 between sheets is small. The gap closes under these forces, beginning at the joints and "rolling" in toward the center of the cell. Although this sheets of plastic are very flexible, elastic force come into play when structure dimensions are a few millimeters or less.

Figure 3:
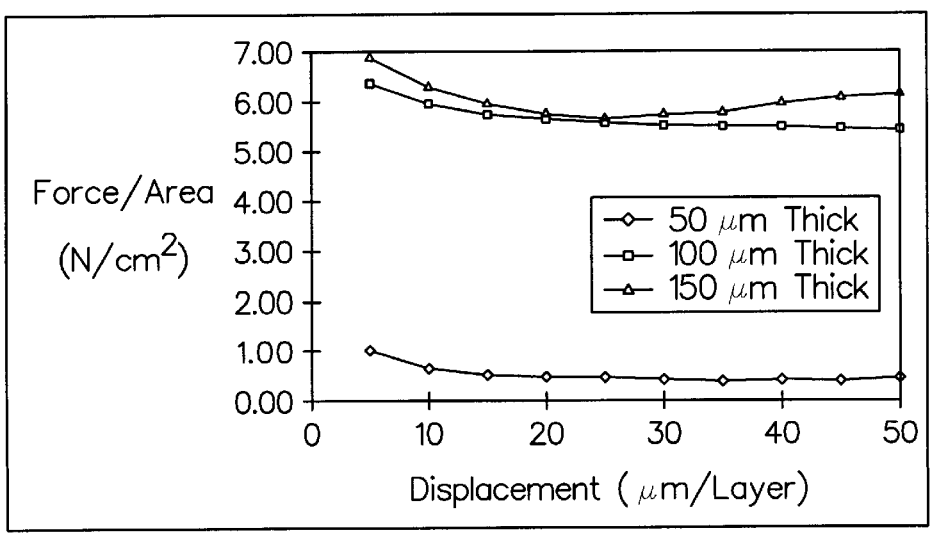
FIG. 3 is a graphical illustration of force per unit cross section for three polymer sheet thicknesses.

The exact design and dimensions of the array can be varied, depending upon whether the goal is maximum output, as measured by force, displacement or work, or maximum output per unit weight or volume. FIG. 3 illustrates some preliminary simulated results, not optimized, to demonstrate the force and displacement of an actuator design according to the present invention. A single unit cell 0.5 cm across and 1 cm along the corrugation, as depicted in FIG. 1, can generate a force of 1 N at under 60 volts. FIG. 3 also demonstrates that there is only a small penalty in force as the maximum displacement is increased, further illustrating the broad range of use for the present invention.

As noted above, actuation of the present invention is accomplished electrostatically. Each layer is biased relative to the adjacent layers, so that strong electric fields (and forces) are present near the point where the layers are in contact, or where the gap 33 is small. These forces pull the sheets together. Since sufficient forces are generated only in the small gap regions, the force does not change significantly as a function of displacement. By nature, the electrostatic force between the sheets is attractive rather than repulsive. Thus the actuator pulls but does not push. Bi-directional actuation is achieved by using two actuators working opposite each other.

Position control in each layer can be achieved either by a two-state scheme where each layer is either fully extended or fully collapsed, or by a continuous scheme where intermediate positioning is possible by an appropriate choice of geometry and applied voltage.

The power source for the actuators of the present invention may be low voltage, such as with a battery although a voltage multiplier may be needed in that case. AC and DC actuator power supplies exist currently or have been designed for producing power for micropump and microvalve applications. Miniaturization of the present invention is contemplated for use with such power sources. FIG. 1 illustrates a power connector 37 and an appropriate control chip 39. In forming the final product using the present invention, one or more chips 39 may be embedded in the housing of the actuator as in FIG. 1. Contact is to the chips via a snap-on cap or flip chip, or other commonly used packaging technology. The dimensions and spacing of the bond pads on each part are designed such that no alignment would be needed beyond the snap-on alignment. The depth of the well for a chip is such that when the cap is snapped in placed, sufficient pressure always exists to make a reliable electrical bond. If desired, plating with indium or gold can be used to achieve an even more reliable connection through cold welding. The housing of the actuator can contain one or more levels of metal interconnects, as in a printed circuit board, to route the input from the external connector through the control circuitry, and finally to the sheets of the actuator.

Contact is made from an inlet 41, shown in FIG. 2, to the individual sheets through flexible plastic lines as in a conventional flex-tape connector. The lines can be metalized plastic or conductive polymer, and, in fact, may be cut from the same polymer sheet as in the stack layers. Layers can be electrically tied together or can be individually addressed, depending on the degree of control and sophistication of the end use, noting that individual addressing requires more connections so it would involve higher cost but finer control when needed.

The present invention offers new ways of making MEMS not currently available to silicon-based MEMS fabrication. The actuator fabrication process has three main steps: fabrication of the individual sheets; bonding the sheets in the desired configuration; and attachment of the, actuator to a housing.

The individual sheets can be preformed using low cost processes such as cutting or stamping, rather than photolithography and etching. The structures may be defined as perforated lines rather than cutting them completely free. Then, once all the layers have been bonded together, the perforations can be broken, separating the layers, by pulling on the ends of the stack. Heat is effective in bonding the sheets together, as would be an adhesive, the latter being less preferred because of the increased spacing between layers with a resultant reduction in force.

Aluminum or other metal or alloy electrodes and one or more dielectric films, such as aluminum oxide or polyparaxylene, or other suitable organic or inorganic dielectrics, are deposited on both sides of each sheet as described above. The conductive portion forms the electrode and the dielectric prevents shorting of the electrodes when they touch. These films can be patterned using standard patterning techniques, such as those to make printed circuit boards. The top dielectric layer should produce a chemically stable surface with a very low surface energy. This is also helpful in controlling stiction. The hydrophobic character of the final layer eliminates humidity effects which are the cause of most operational failures in touch-mode electrostatic actuators. The level of performance that can be obtained from an electrostatic actuator depends on the dielectric strength of the material used as a dielectric.

As will become apparent from the foregoing detailed description, the present invention is admirably suited for various applications, such as portable or airborne systems where weight is critical, or systems operated remotely over a low power bus line. Other operations such as remotely operated ground and water vehicles, robotics, positioning system shutters, valves and pumps are among the devices contemplated for this invention.

While particular embodiments of the present invention have been illustrated and described, it is not intended to limit the invention, except as defined by the following claims.

What is claimed is:

1. A microactuator array device, comprising:
   a plurality of generally parallel thin flexible polymer sheets bonded together in a predetermined pattern to form an array of unit cells on at least one layer;
   thin conductive and dielectric films deposited on said sheets to form a plurality of electrodes associated with said array of unit cells;
   a source of electric potential operably connecting said electrodes such that adjacent layers of electrodes are biased with respect to each other to form actuators, whereby electrostatic forces are generated most intensely proximate the point where the gap between said sheets is smallest; and
   inlets and outlets for each cell to permit displacement of fluid during generation of said electrostatic forces.

2. The device of claim 1, wherein said plurality of sheets forms a stack of layers at least one unit cell per layer.

3. The device of claim 2, wherein said layers are configured such that bi-directional activation is caused by pairs of actuators working opposite each other.

4. The device of claim 1, wherein at least one of every pair of said sheets are preformed into corrugations to provide a predetermined mechanical bias between said pairs.

5. The device of claim 1, wherein at least one of every pair of said sheets are preformed into flaps to provide a predetermined mechanical bias between said pairs.

6. The device of claim 1, wherein said sheets form curved portions by an applied load to provide a displacement between said pairs.

7. The device of claim 1, wherein said sheets are from about 1 $\mu$m to about 100 $\mu$m thick and said cells have an individual displacement of from about 5 $\mu$m to about 200 $\mu$m.

8. A microactuator array device, comprising:
   a plurality of generally parallel thin flexible polymer sheets bonded together in a predetermined pattern to form an array of unit cells on at least one layer;
   thin conductive and dielectric film means deposited on said sheets to form a plurality of electrode means associated with said array of unit cells;
   electric potential means for providing a source of electric potential operably connecting said electrodes such that adjacent layers of electrodes are biased with respect to each other to form actuator means, whereby electrostatic forces are generated most intensely proximate the point where the gap between said sheets is smallest; and
   transfer means for each cell to permit displacement of fluid during generation of said electrostatic forces by operation of said electric potential means.

9. The device of claim 8, wherein said array means are configured such that bi-directional activation is caused by pairs of actuator means working opposite each other.

10. The device of claim 8, wherein at least one of every pair of said sheets are preformed into corrugations to provide a predetermined mechanical bias between said pairs.

11. The device of claim 8, wherein at least one of every pair of said sheets are preformed into flaps to provide a predetermined mechanical bias between said pairs.

12. The device of claim 8, wherein said sheets form curved portions by an applied load to provide a displacement between pairs.

13. The device of claim 8, wherein said sheets are from about 1 $\mu$m to about 100 $\mu$m inches thick and said cells have an individual displacement of from about 5 $\mu$m to about 200 $\mu$m.

\* \* \* \* \*